(12) United States Patent
Pu

(10) Patent No.: US 6,892,463 B1
(45) Date of Patent: May 17, 2005

(54) LASER BEAM MODULE FOR SIMULTANEOUSLY PRODUCING TWO MUTUALLY PERPENDICULAR OPTICAL PLANES

(76) Inventor: Jian-Hua Pu, 14F-2, No. 421, Sungshan Rd., Shinyi Chiu, Taipei (TW), 110

( * ) Notice: Subject to any disclaimer, the term of this patent is extended or adjusted under 35 U.S.C. 154(b) by 0 days.

(21) Appl. No.: 10/694,865

(22) Filed: Oct. 29, 2003

(51) Int. Cl.[7] .................. G01B 11/26; G01C 15/02
(52) U.S. Cl. ............... 33/281; 33/DIG. 21; 356/138
(58) Field of Search ................. 33/227, 262, 263, 33/276, 281, 282, 285, DIG. 21; 356/138, 147, 254; 359/629

(56) References Cited

U.S. PATENT DOCUMENTS

| | | | | | |
|---|---|---|---|---|---|
| 3,982,839 | A | * | 9/1976 | Schwartz | ............... 33/DIG. 21 |
| 5,218,770 | A | * | 6/1993 | Toga | ........................... 33/276 |
| 5,539,990 | A | * | 7/1996 | Le | ............................... 33/281 |
| 5,588,216 | A | * | 12/1996 | Rank et al. | ............. 33/DIG. 21 |
| 5,836,081 | A | * | 11/1998 | Orosz, Jr. | ............... 33/DIG. 21 |
| 5,864,956 | A | * | 2/1999 | Dong | ........................... 33/227 |
| 6,493,952 | B1 | * | 12/2002 | Kousek et al. | ......... 33/DIG. 21 |
| 6,536,122 | B2 | * | 3/2003 | Tamamura | ............. 33/DIG. 21 |
| 6,588,115 | B1 | * | 7/2003 | Dong | ........................... 33/227 |
| 6,751,879 | B1 | * | 6/2004 | Pu | ............................... 33/227 |
| 2001/0025425 | A1 | * | 10/2001 | Haijima et al. | ............... 33/281 |

* cited by examiner

Primary Examiner—G. Bradley Bennett
(74) Attorney, Agent, or Firm—Troxell Law Office, PLLC

(57) ABSTRACT

A laser beam module capable of simultaneously producing two mutually perpendicular optical indicator planes, and adapted for usage on building construction sites, thereat synchronously acquiring horizontal and perpendicular measurements as a basis for datum lines. The laser beam module primarily comprises a laser beam generator, a deflector is disposed in an optical path and utilized to split a laser beam thereof, whereby two light beams emerging from the deflector synchronously proceed towards two optical expanders, the two optical expanders being positioned such as to be mutually perpendicularly related, wherefrom the two light beams are synchronously transformed and therefrom expand to project a horizontal optical plane (beam) and a vertical optical plane (beam).

17 Claims, 14 Drawing Sheets

LASER BEAM MODULE FOR SIMULTANEOUSLY PRODUCING TWO MUTUALLY PERPENDICULAR OPTICAL PLANES

BACKGROUND OF THE INVENTION (a) Field of the Invention

The present invention is related to a laser beam module for usage on building construction sites, interior repairs and redecoration, etc., where there is a requirement for one or a group of reference planes when making measurements and for calibration usage. At the construction site, datum reference planes must be definite and visible, therefore, usually, the most common datum are a horizontal plane or a perpendicular plane.

(b) Description of the Prior Art

A semiconductor laser is in common use as a tool for producing an indicator datum line and datum plane because of small size, high luminous light beam, and low price.

Current laser scanners are only capable of producing an optical horizontal plane, or by adding an auxiliary device to supplement operation; a perpendicular optical plane can also be produced and used as a perpendicular measurement reference. However, this is inconvenient.

A primary objective of the present invention is to provide a laser instrument having a structure that is light and convenient, requires little effort to operate, of simple construction, while being capable of simultaneously producing a horizontal optical plane and a vertical optical plane.

Referring to a prior patent applied by the inventor, wherein describes an optical plane generator including a vertical light beam generator and a light beam expander, whereby the light beam expands along a symmetrical axis of the light beam and forms an optical reference plane therefrom.

Many prior art designs have disclosed related laser leveling instruments, all utilizing an electric motor to drive an optical deflecting prism. The laser leveling instruments are supported by a scaling stand type support, thereby acquiring a level angular position with certainty. However, prior art designs are cumbersome and functional performance leaves room for improvement, resulting in disadvantages of bulkiness and inconvenience in usage.

SUMMARY OF THE INVENTION

Wherefore, the present invention is particularly directed towards horizontal and perpendicular reference planes, wherethrough a deflector or semi-reflecting method is utilized to acquire two angular perpendicularly related light beams. Furthermore, a horizontal plane reference beam and a perpendicular plane reference beam are synchronously acquired by means of respective optical expander methods.

A first objective of the present invention is a perpendicularly positioned optical expander, wherewith any angular position of the surrounding environment can be projected upon by means of a continuous perpendicular plane of light beams.

A second objective of the present invention is related to a reflecting surface of an optical deflector, wherewith, in order to synchronously form two perpendicularly related light beams, the optical deflector can utilize a semi-reflecting plated film method, thereby allowing reflecting of one portion of the light beam and direct transition through the optical deflector of remaining portion of the light beam.

A third objective is an embodiment of the optical expander, whereby an electric motor can be utilized to facilitate propagating the light beam for scanning, or a conical shaped reflector is employed to expand the light beam and project the perpendicular optical plane therefrom.

The present invention employs a laser module, and is an adaptation and simplification of the aforementioned two modules (the optical expander and the optical deflector), wherewith a horizontal plane and perpendicular plane are produced. For descriptive convenience, a hollow electric motor together with a conical light beam reflector is named an optical expander. Two aforesaid modules are disposed such that the two modules are in a perpendicular relation, therefrom producing two mutually perpendicular optical planes.

For descriptive convenience, two optical expanders are respectively named a horizontal first light beam expander and a perpendicular second light beam expander; optical planes produced by the two light beam expanders are respectively named a first optical plane (beam) and a second optical plane (beam). A laser beam irradiated from the laser module is split into two light beams by a deflector, therefrom the two light beams proceed towards the two aforesaid expanders respectively.

The optical deflector may be a plane reflecting mirror set at 45° to an incident light beam, or a right angle prism, wherewith a reflecting face is utilized to cast a light beam at 90° to the incident light beam.

In order to ensure high precision accuracy and maintain a stable perpendicular state, two reflecting faces are usually utilized, wherewith operating principle is: upon a light beam undergoing consecutive reflection from two reflecting surfaces, an included angle between an emergent light beam and the incident light is double the incident angle between the two reflecting surfaces. At this time, an error in light beam deflection is decided by a deviation in the included angle between the two light beams. When the included angle between the two reflecting planes is 45°, the incident light beam and the emergent light beam are effectively mutually perpendicular.

With a pentagonal prism made from optical transmitter material, there includes in effect four optical surfaces for this kind of deflector. Upon the light beam being refracted twice and twice reflected, the emerging light beam and the original incident light beam are effectively mutually perpendicular.

Application of the optical deflector may come from use of a beam splitting optical component, whereby an irradiation end simultaneously produces two mutually perpendicular light beams. The beam splitting optical component may be a plane parallel transparent plate having a semi-reflecting plated film, and set at an angle of 45° to the incident light beam.

The aforementioned deflector may be a cubic prism, whereby the cubic prism is formed from two right-angle prisms joined together along two inclined faces of the right-angle prisms respectively, wherein at least one inclined face is plated with semi-reflecting film.

The beam splitting optical deflector component of the present invention may also utilize two planes parallel transparent plates set at an included angle of 45°, the light beam perpendicular to the incident light beam is formed after undergoing twice sequential reflection.

With a pentagonal prism, in order to facilitate a portion of the light beam being transmitted through the pentagonal prism along original direction of the incident light beam thereof, an optical reflecting plane directly opposite a light beam irradiating from the laser module is adapted to having a plated semi-reflection film. The light beam passing through the semi-reflecting film, because of refraction and deviation in direction of the original incident light beam, in order to maintain original invariable direction of the incident light beam an optical wedge is affixed to a surface of the beam splitting plated film.

In a first embodiment of the present invention, a fine laser beam is initially irradiated from the laser module towards the first optical expander, a portion of the incident laser beam enters the first optical expander and expanded to form the first optical plane therefrom; remaining portion of the laser beam proceeds towards the optical deflector, whereupon the laser beam is deflected 90° and proceeds towards the second optical expander to form the second optical plane perpendicular to the first optical plane.

In the foregoing first embodiment, the first optical deflector must simultaneously possess functionality of optical beam splitting and optical expander.

In a second embodiment of the present invention, the fine laser beam irradiated from the laser module is initially pre-split by means of the beam splitting optical component to form two mutually perpendicular beams of light, whereupon the two beams of light separately proceed towards the first optical expander and the second optical expander respectively, and therefrom respectively expand to form two mutually perpendicular optical planes.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Before describing the present invention, an optical deflector according to the present invention will be initially described.

Figure 1A:
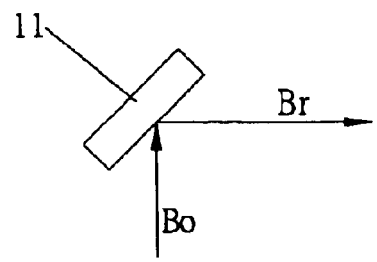
FIG. 1a represents a 45° reflecting mirror optical deflector.

Referring to FIG. 1a, which shows the optical deflector of simplest design comprising an incident light beam Bo incident upon a 45° reflecting mirror 11, a reflected light beam Br is perpendicular to the incident light beam Bo. Upon the reflecting mirror 11 transforming axis of direction of the incident light beam Bo, the reflected light beam Br scans a horizontal optical plane therefrom.

Figure 1B:
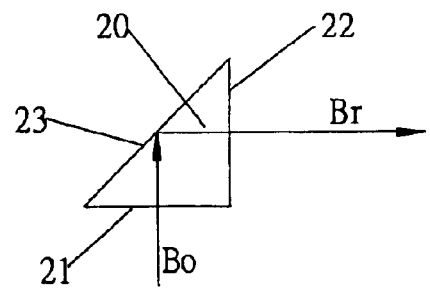
FIG. 1b represents a right-angle prism.

Referring to FIG. 1b, which shows a right-angled prism deflector 20 having three planes 21, 22 and 23; the planes 21 and 22 are mutually perpendicular, and the plane 23 is at 45° to the aforesaid planes 21 and 22. The incident light beam Bo irradiates the plane 23, and because of total reflection, the incident light beam Bo is totally reflected towards the plane 22, thereat penetrates the plane 22 forming the light beam Br perpendicular to the incident light beam Bo. Furthermore, as foresaid, upon the deflector 20 similarly transforming the axis of direction of the incident light beam Bo, the reflected light beam Br scans the horizontal optical plane therefrom.

Figure 1C:
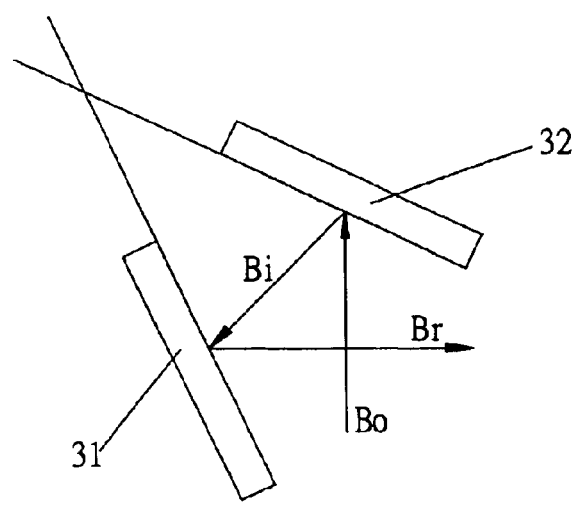
FIG. 1c represents a double reflecting mirror optical deflector.

The aforesaid optical deflector component is firmly installed at a 45° angle to the incident light beam to ensure high precision accuracy, and, as FIG. 1c shows, usually utilizes two reflecting planes 31 and 32 configured at an included angle of 45° between the two reflecting planes 31 and 32. The perpendicular angle of the emerging light beam Br with the incident light beam Bo is not related to directions of the corresponding incident light beams of the two reflecting planes 31 and 32, wherefore an error margin is decided on by inaccuracy of the 45° included angle between the two reflecting planes 31 and 32.

Figure 1D:
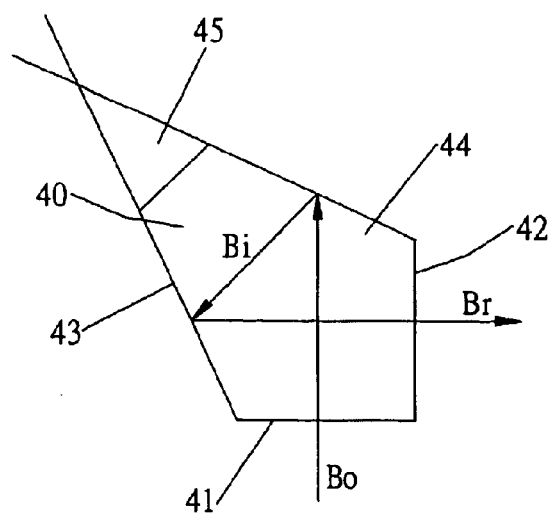
FIG. 1d represents a pentagonal prism optical deflector.

A pentagonal prism is a more accurate and stable optical deflector. Referring to FIG. 1d, which shows a prism 40 having five plane surfaces 41–45, among which two optical refracting planes are mutually perpendicular (the incident light plane 41 and the emergent light plane 42); the included angle between the two reflecting planes is 45° (the first reflecting plane 43 and the second reflecting plane 44). An incision plane 45 is a non-optical plane. In first instance, the incident light beam Bo is incident upon the surface 41, and thereupon enters the prism becoming an incident light beam for the first reflecting surface 44; the second reflecting surface 43 reflects a light bream Bi towards the surface 42, which thereupon is refracted to form the light beam Br and emerges from the prism thereat. The incident light beam Bo and the deflected light beam Br are mutually perpendicular.

Figure 2A:
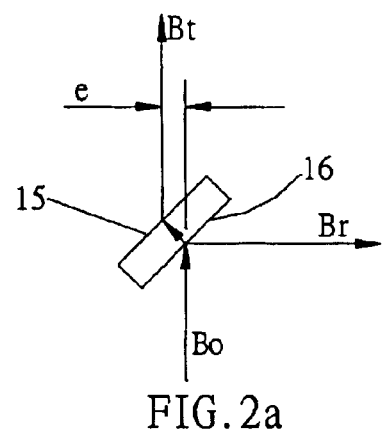
FIG. 2a represents a 45° beam splitting optical deflector.
Figure 2B:
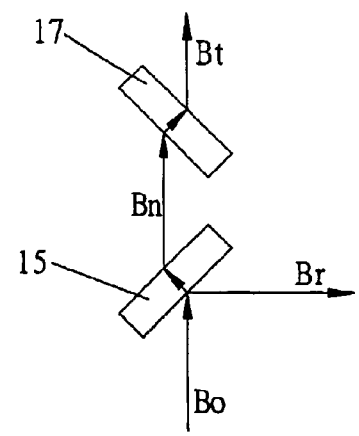
FIG. 2b represents a 45° beam splitting optical deflector for correcting parallel offset of a beam of light.

An improvement in the aforementioned optical deflector is a beam splitting optical component enabled to simultaneously produce two mutually perpendicular beams of light. An improved design of the beam splitting optical component is as follows:

Semitransparent film is used to replace reflecting film on the planar, parallel reflecting mirror 11 depicted in FIG. 1a, thereby achieving the simplest beam splitting optical component. Referring to FIG. 2b, a beam splitting component 15 is configured at 450 such that a portion of the incident light beam Bo is reflected by the beam splitting film 16 forming the light beam Br perpendicular to the incident light beam Bo, while remaining portion of the incident light beam Bo is transmitted through the beam splitting component 15 and emerges as a transmitted light beam Bt. In order to correct resulting offset distance e, two parallel surfaces of an optical plate 17 corresponding to two parallel surfaces of the beam splitting component 15 are utilized to compensate the offset distance e. Because of thickness between the two parallel plane surfaces of the beam splitting component 15, thereby results in an offset distance e between the refracted light beam Bn and the corresponding incident light beam Bo, whereon thickness of the plate 17 neutralizes the offset distance e, and results in the transmitted light beam Bt and the incident light beam Bo being collinear.

Figure 2C:
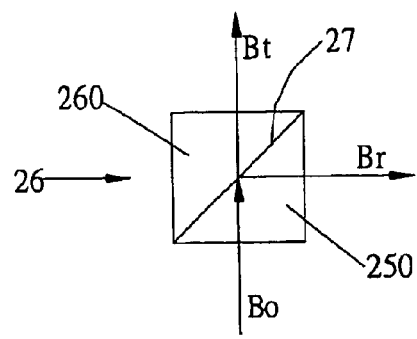
FIG. 2c represents a cubic prism.

Two inclined surfaces of two right-angled prisms 250 and 260 are joined together, and therefrom a cubic prism is formed (see FIG. 2c). One inclined surface is plated with a semi-reflecting film to form a beam splitting film 27. One portion of the incident light beam Bo upon entering the prism 250 reflects from the beam splitting film 27, and forms the emergent horizontal light beam Br therefrom, while remaining portion of the incident light beam Bo is transmitted through the beam splitting film 27 and emerges from the prism 260, therefrom forming the light beam Bt collinear with the incident light beam Bo.

In order to have the emergent light beam Bt collinear with the incident light beam Bo, the reflecting surface 32 of FIG. 1c can be replaced by a plated semitransparent beam splitting film, whereby a portion of the incident light beam Bo is deflected by the beam splitting film to form the deflected light beam Br, and remaining portion is transmitted through the semitransparent beam splitting film to form an emergent light beam Bt parallel with the incident light beam Bo thereof.

Figure 2D:
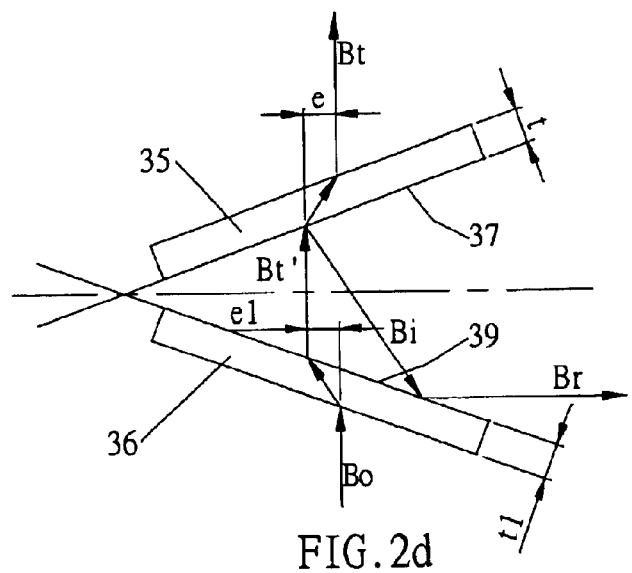
FIG. 2d represents a double reflecting mirror optical deflector plated with a beam splitting film.

However, similarly, because of influence of thickness of the optical plate, there is an offset distance e between the incident light beam Bo and the emergent light beam Bt. Two planar, parallel plates (see FIG. 2d) can be utilized to compensate for the offset distance e. The two parallel plates can be appropriately configured to ensure the emergent light beam Bt is collinear with the incident light beam Bo thereof. The included angle between two plates 35 and 36 is configured at 45°. A reflecting surface 39 of the plate 36 is plated with reflecting film. The incident light beam Bo passes through the plate 36 and proceeds towards a beam splitting film 37 of the plate 35. Because of the effect of thickness t1 of the plate 36, there is an offset distance e1 between an emergent light beam Bt' and the incident light beam Bo. Upon the emergent light beam Bt' passing trough the beam splitting film 37, and thereon passing through the plate 35, again because of effect of thickness t of the plate 35, the offset distance e between the emergent light beam Bt' and emergent light beam Bt is compensated for, and the emerging light beam Bt emerges along same axis as that of the incident light beam Bo thereof.

Figure 2E:
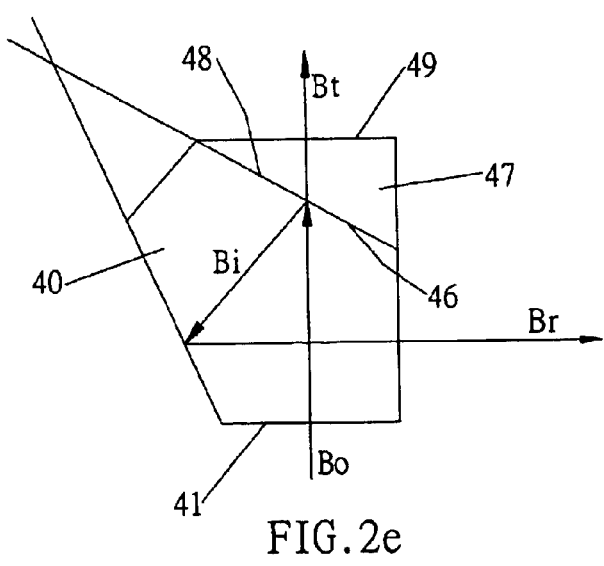
FIG. 2e represents a double reflecting mirror optical deflector with translational corrected light beam along directional axis

The first reflecting surface 44 of the pentagonal prism as depicted in FIG. 1d is plated with a beam splitting film, and the first reflecting surface 44 forms a reflecting surface 46 thereat (see FIG. 2e). One portion of the incident light beam Bo is reflected off the reflecting surface 46 to form the light beam Bi, and remaining portion is transmitted through the prism to form the light beam Bt therefrom. Because the reflecting surface 46 is not perpendicular to the incident light beam Bo, the emerging light beam Bt will have deviated from original directional axis of the incident light beam Bo by an angle of deviation. In order to realign the directional axis of the incident light beam Bo and the emerging light beam Bt so that they are collinear, an optical wedge 47 is affixed to the reflecting surface 46, whereby the optical wedge 47 is configured with two optical refracting surfaces 48 and 49. Assemblage of the optical refracting surface 49 and the incident surface 41 is such that the assemblage equivalents to an optical plane having parallel planar surfaces. One portion of the incident light beam Bo is transmitted through the reflecting surface 46 of the prism 40, and thereupon enters the optical wedge 47, and emerges from the surface 49, of the prism as the resultant light beam Bt.

The present invention employs the aforementioned optical deflectors and variant optical expanders, thereby facilitating simultaneously producing two mutually perpendicular optical planes.

The present invention primarily employs an optimal deflector as disclosed above, and is placed indirectly in pre- or mid- optical path of a light beam expander system, thereby simultaneously acquiring a horizontal first optical plane, or perpendicular second optical plane. A description of an optical expander is initially described hereinafter.

Figure 3A:
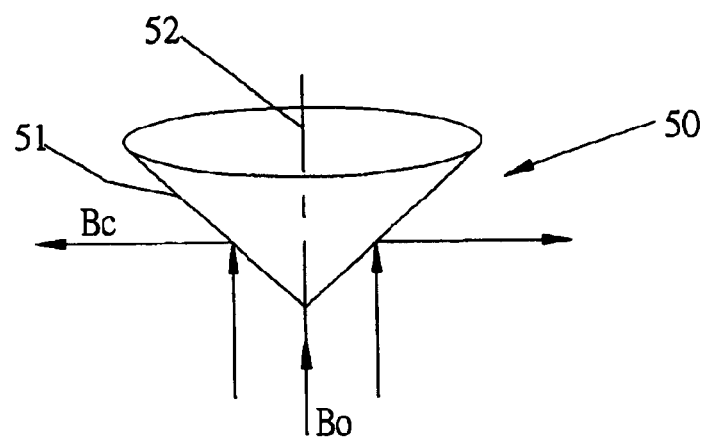
FIG. 3a represents a conical reflecting mirror.

FIG. 3a shows a reflecting cone 50, a vertex angle of the reflecting cone 50 is configured at a 90° angle, and a reflecting surface 51 is rotationally symmetrical about axis 52. The incident light beam Bo is reflected off along the reflecting surface 51, and resulting circular-shaped light beam is expanded to form an optical plane Bc.

Figure 3B:
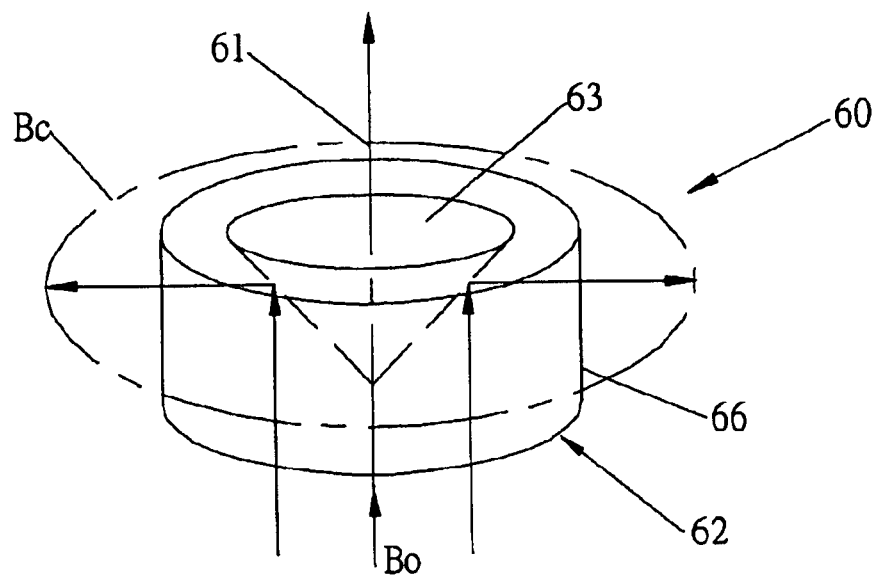
FIG. 3b represents a conical totally reflecting mirror (holophote).

Referring to FIG. 3b, which shows a totaling reflecting optical expander 60 having a conical-shaped interior and being optically transparent. The expander 60 includes one optical reflecting surface 62; an inner conical surface 63 is rotationally symmetrical about axis 61, with a periphery forming a cylindrical window 66. Upon the incident light beam Bo entering the conical surface 63, as long as optical refractive index of an optical transparent body is greater than a specific value, the incident light beam Bo will be totally reflected. Regarding requirement for a reflected light beam to emerge perpendicular to the incident light beam, the refractive index of the optical transparent body can not be smaller than 1.4142. However, an overwhelming majority of optical materials, such as optical glass and optical plastics, have a refractive index much greater than 1.4142, therefore the reflected light beam is expanded to form the first optical plane Bc.

Figure 4A:
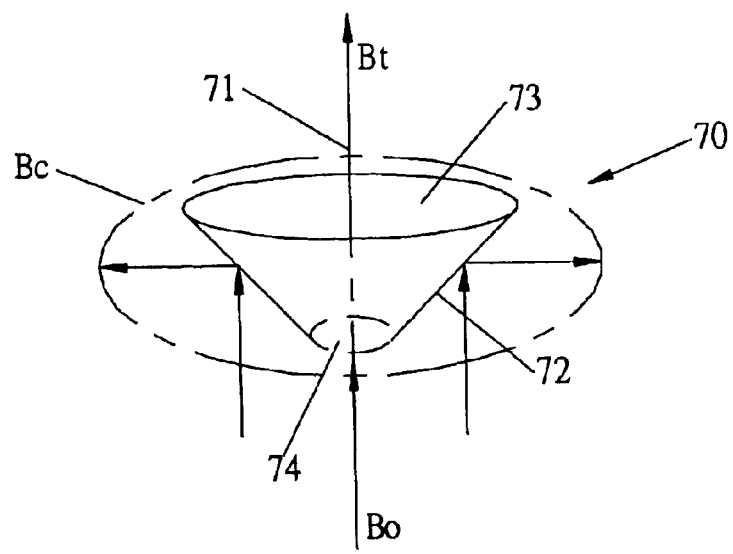
FIG. 4a represents a beam splitting conical reflecting mirror.
Figure 4B:
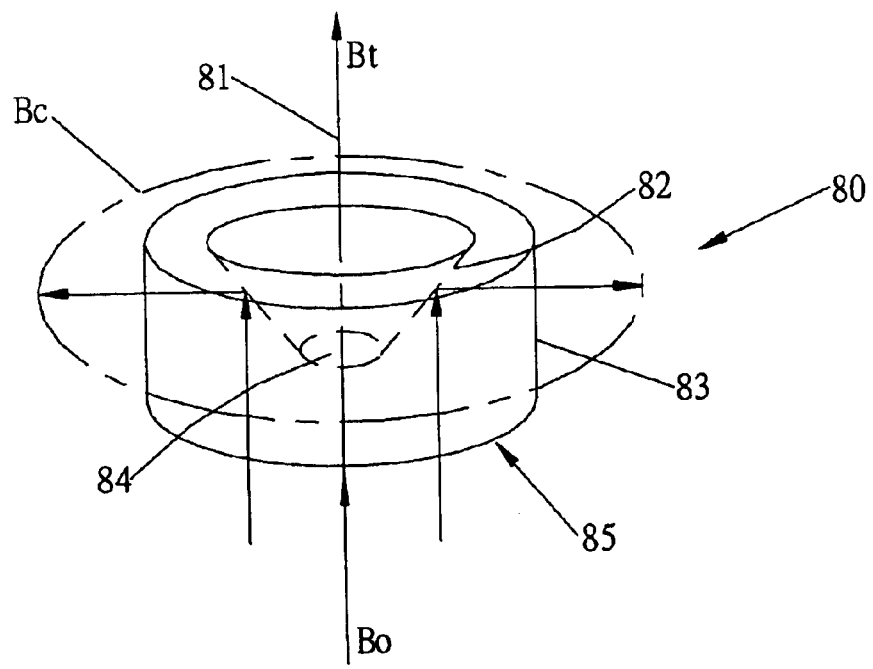
FIG. 4b represents a beam splitting conical totally reflecting mirror (holophote).

Further, referring to FIGS. 4a and 4b, which show an optical expander effectively having beam-splitting functionality.

Referring to FIG. 4a, which depicts a beam splitting conical mirror functioning as an optical transparent expander 70, and having a vertex angle of 90°, conical surface 72 is plated with reflecting film; a base surface 73 is an optical plane perpendicular to axis 71. Cone apex of the optical transparent expander 70 is cut to form a small optical surface 74 parallel to the base surface 73. A cross section of the small optical plane 74 is large enough to allow a portion of the incident light beam Bo to enter along the axis 71 and be transmitted through towards the base surface 73 therefrom, whereupon the light beam Bt emerging from the base surface 73 is collinear with the incident light beam Bo, while remaining portion of the incident light beam Bo is reflected off the conical surface 74 and therefrom expanded to form the first optical plane Bc.

Referring to FIG. 4b, which depicts the beam splitting conical mirror functioning as a totally reflecting conical optical expander 80. The conical optical expander 80 includes an optical incident surface 85, an inner conical surface 82, which is rotationally symmetrical about axis 81, and an optical cylindrical surface 83, which is rotationally symmetrical about the axis 81. A small optical surface 84 is adaptably cut at an apex of the conical surface 82 so as to be parallel to the incident surface 85. The optical incident surface 85 is perpendicular to and rotationally symmetrical about the axis 81. When diameter of the incident light beam Bo is greater than the small optical surface 84, and the incident light beam Bo enters the conical optical expander 80 along the axis 81 and perpendicular to the incident surface 85, thereupon a portion of the incident light beam Bo is transmitted vertically through the conical optical expander 80 and emerges as the vertical light beam Bt, while remaining portion of the incident light beam Bo proceeds towards the conical surface 82, and as long as the refractive index of the transparent optical body is greater than a specific value, the incident light beam Bo is thereupon totally reflected and forms the optical plane Bc thereof.

A first embodiment of the present invention enables simultaneous production of two mutually perpendicular optical planes, wherein an optical deflector is placed in an optical path after a first light beam expander.

Figure 5:
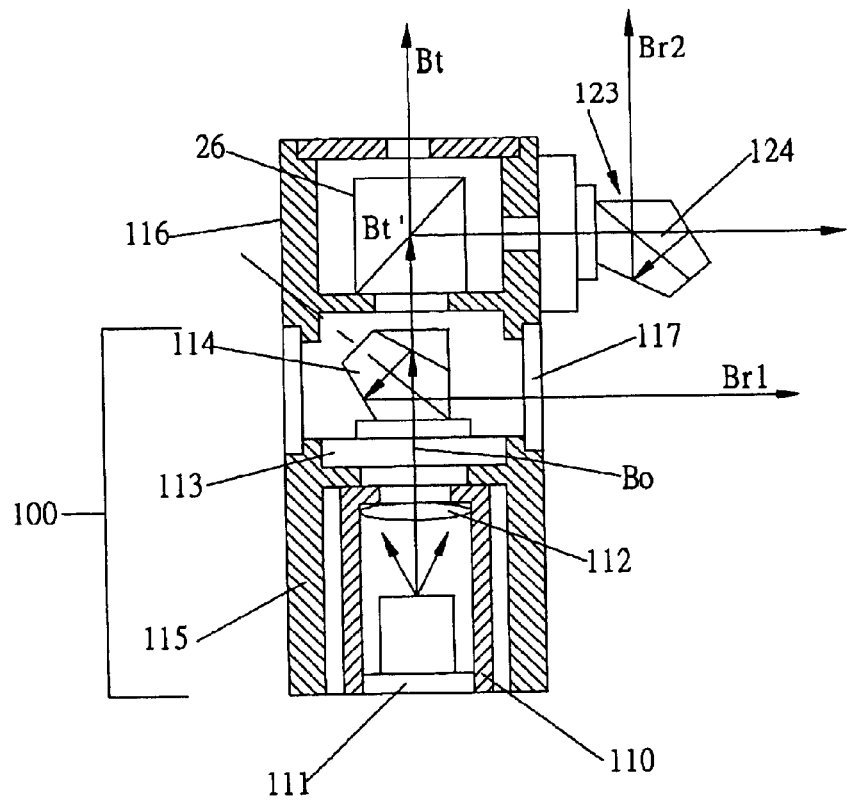
FIG. 5 represents first embodiment utilizing a rotating pentagonal prism.

Referring to FIG. 5, which depicts the first embodiment of the present invention utilizing a rotating optical deflector device, and constructed to include one laser module 110, one hollow electric motor 113, and one pentagonal prism 114 securely fitted on a rotating spindle configured in a hollow of the electric motor 113. The laser module 110 and the hollow electric motor 113 are securely fixed together in a housing 115, thereby allowing a laser beam irradiated from the laser module 110 and the rotating spindle of the hollow electric motor 113 to be collinear.

The laser module 110 includes one semiconductor laser 111 and an optical focusing system 112. A diffused laser beam irradiated from the semiconductor laser 111 upon passing through the optical focusing system 112 is focused to form the light beam Bo. The light beam Bo passes through a through-hole (not shown) configured in the rotating spindle of the hollow electric motor 113, and thereon proceeds towards a rotating pentagonal prism 114 having a compensating optical wedge configured thereon. A light beam Br1 is reflected from a beam splitting film, and therefrom passes through a transparent window 117 to form the horizontal first optical plane. A light beam Bt' is transmitted through the beam splitting film and enters the optical deflector 26, whereupon the light beam Bt' is reflected and passes horizontally through a center of another hollow electric motor 123, and thereon passes through a through-hole (not shown) configured in a rotating spindle of the hollow electric motor 123, and proceeds towards a rotating pentagonal prism 124. A reflected light beam Br2 emerges from the pentagonal prism 124 to form the perpendicular second optical plane. The light beam Bt passing through the optical deflector 26 is in directional superposition with incident light beam Bo.

Positioning of the optical deflector 26 and a second light beam expander are fixed by a structural housing 116.

When the incident light beam Bo acts as central rotational axis for the structural housing 116, through adjustment, the second optical plane can be configured to project on to any angular position of surrounding environment, thereby allowing any indicator mark to act as basis for a perpendicular reference surface. In other words, the second optical plane can arbitrarily appear at any angular position to the first optical plane.

The optical deflectors as disclosed above can all replace the deflector 26 as depicted in the drawings.

Figure 6A:
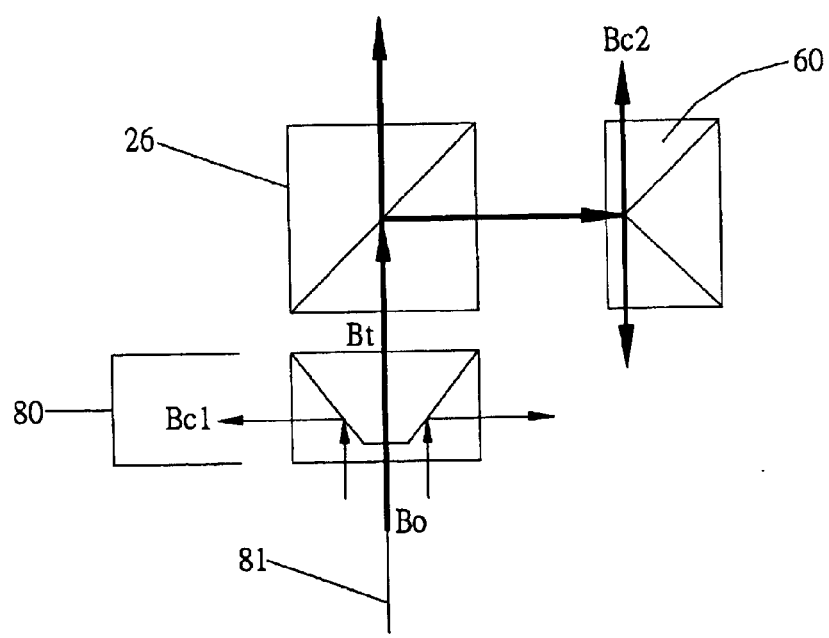
FIG. 6a represents the first embodiment utilizing conical totally reflecting mirror (holophote).

FIG. 6a shows a totally reflecting conical optical deflector 80 as a first light beam deflector. The incident light beam Bo enters the conical optical deflector 80 along the axis 81, whereupon a portion of the incident light beam Bo passes through the conical optical deflector 80 and emerges as the light beam Bt, while remaining portion of the incident light beam Bo undergoes total reflection from the inner conical surface and expands to form the first optical plane Bc1. The transmitted light beam Bt is deflected by the deflector 26 and directed towards a horizontally placed second light beam expander 60. A light beam emerging from the second light beam expander 60 forms the second optical plane Bc2.

Figure 6B:
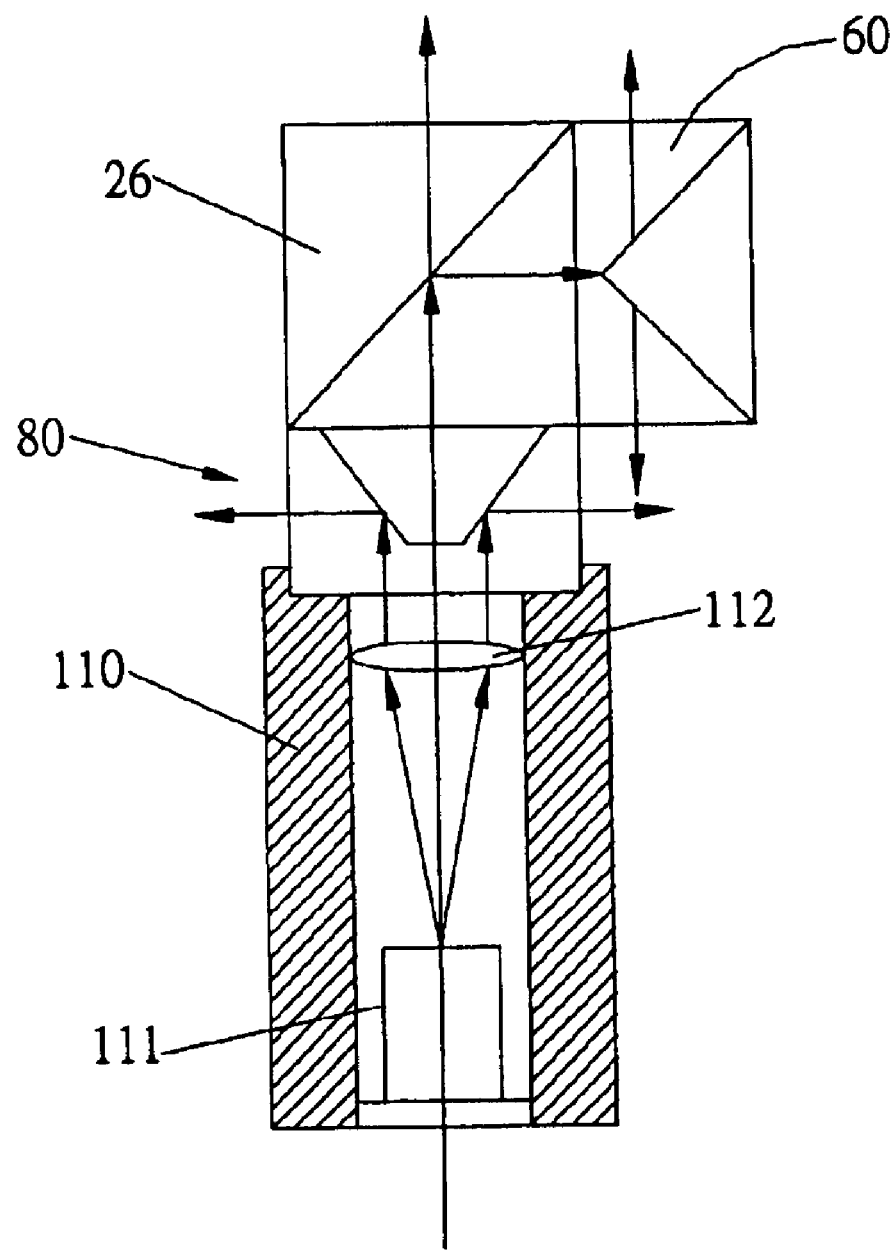
FIG. 6b represents a module of the first embodiment utilizing the conical totally reflecting mirror (holophote).

The first light beam expander 80 and the second light beam expander 60 are joined to an incident plane and an emergent plane of the optical deflector 26 respectively to form a composite body thereof (see FIG. 6b), further, in conjunction with the laser module 110 enables simultaneously producing two mutually perpendicularly related optical planes. Furthermore enabling a module to produce a planar normal (perpendicular line).

Figure 6C:
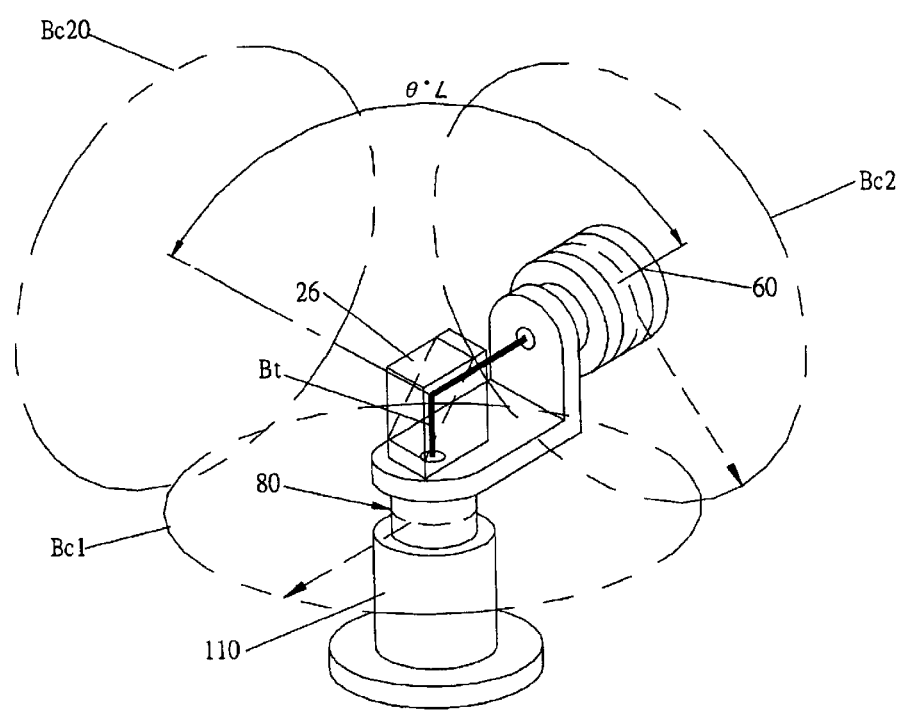
FIG. 6c represents an elevational view of a perpendicular plane centro-axial deflected from the second optical expander according to the present invention.
Figure 6D:
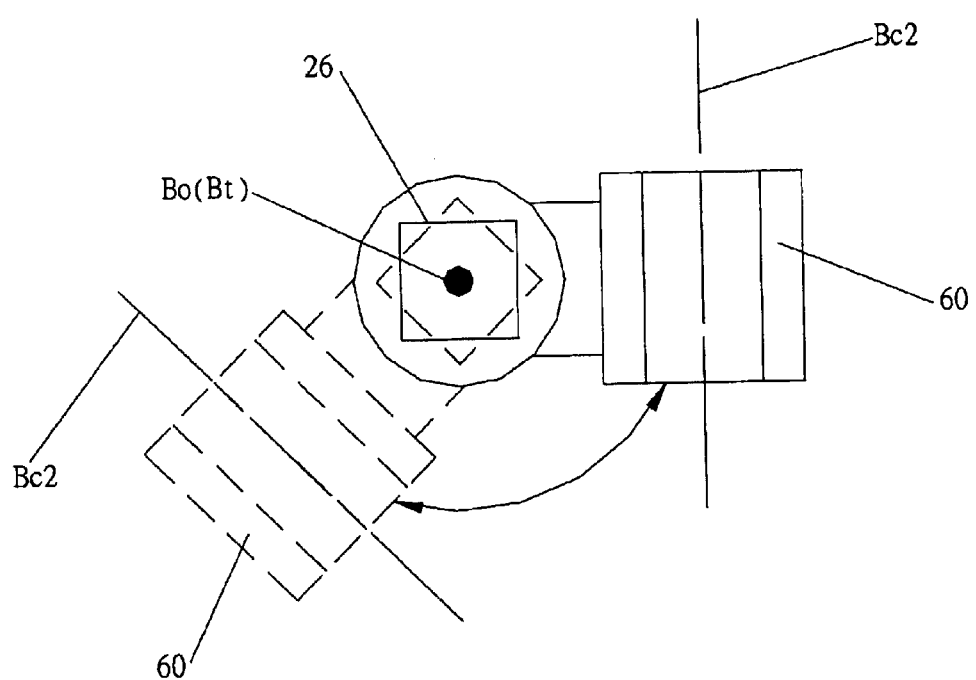
FIG. 6d represents a vertical view of the drawing in FIG. 6c.

FIGS. 6c and 6d repeat what is depicted in FIG. 5, wherein the second light beam expander is disclosed. The second light beam expander 60 is enabled to coaxially encircle the incident light beam Bo, and facilitates periphery translation by an angle θ°, whereby a marker position at any angular position encircling the laser beam module may acquire the second optical plane Bc2. As FIGS. 6c and 6d depict, the first optical expander 80 is configured above the laser module 110. Upon the laser beam being expanded to form the first optical plane Bc1, the light beam Bt is transmitted through the first optical expander, whereat the light beam Bt passes through the deflector 26 and is horizontally reflected towards the second optical expander 60. The second optical expander 60 expands the light beam Bt to form the perpendicular second optical plane Bc2. The second optical expander 60 is enabled to encircle the laser module 110, whereby adjusting the periphery translation angle θ° around a central point (see FIG. 6d) enables the second optical expander 60 to encircle the axial center Bt, rotating the second optical plane Bc2 thereof, and allowing diversification of angular position at which the second optical plane Bc2 is projected.

Figure 7A:
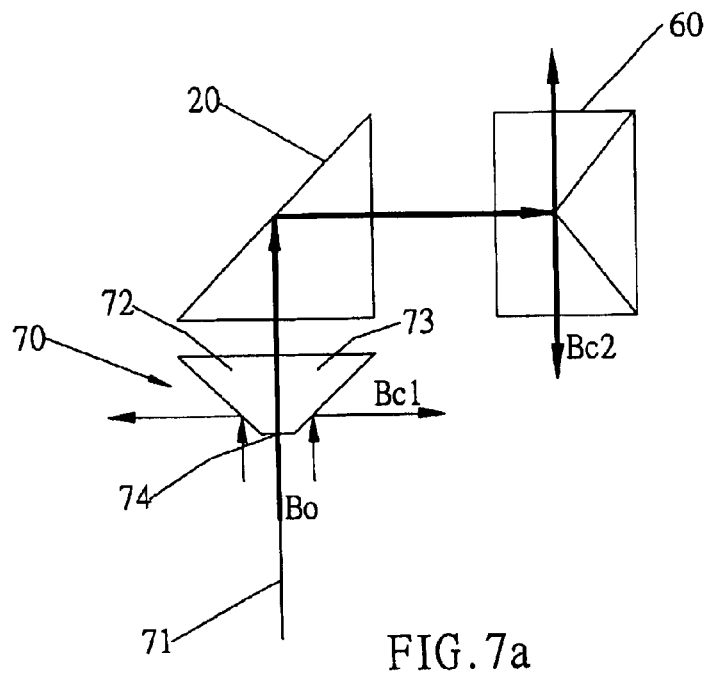
FIG. 7a represents the first embodiment utilizing the reflecting mirror and the conical totally reflecting mirror (holophote).

Referring to FIG. 7a, which shows a beam splitting conical first expander 70. The light beam Bo enters the conical first expander 70 along axis 71, one portion of the incident light beam Bo passes through the conical first expander 70 and proceeds towards the deflector 20, remaining portion of the light beam Bo reflects off a conical surface 72 and forms the first optical plane Bc1 therefrom. The light beam Bo deflects off the deflector 20 and enters the second optical expander 60 to emerge as the second optical plane Bc2.

Figure 7B:
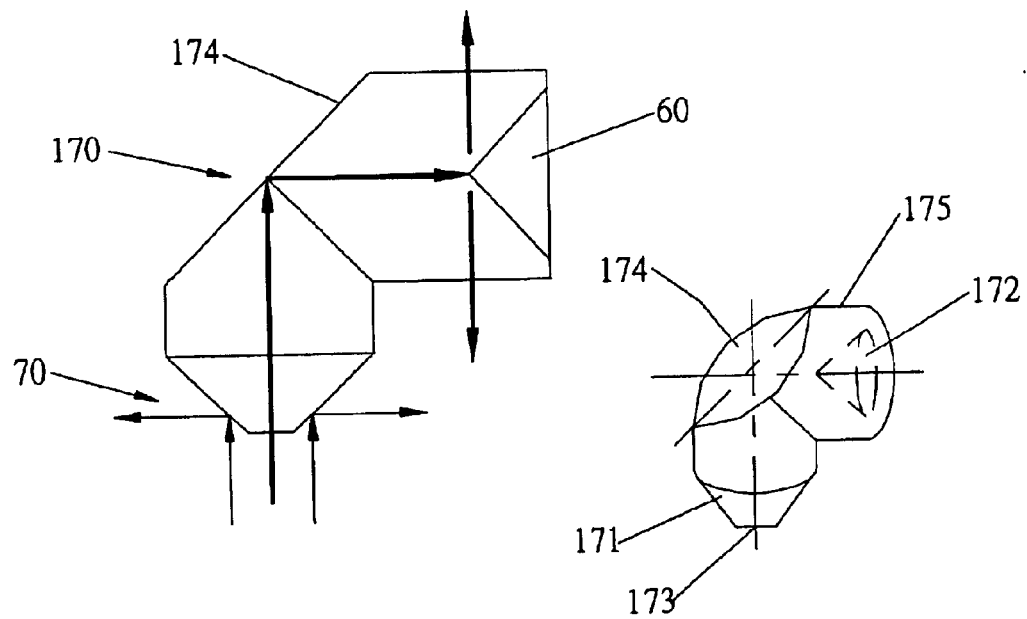
FIG. 7b represents a composite body of the first embodiment comprising the reflecting mirror, the conical totally reflecting mirror (holophote) and the optical deflector.

The first optical expander 70 utilized in FIG. 7a and FIG. 7b is a totally reflecting conical mirror having advantage of being able to form a composite body from the first expander 70, the second expander 60 and the right-angled prism deflector 20 (see FIG. 7b). The base surface 73 of the first optical expander 70 and an incident plane of the right-angled prism deflector 20 are joined together, and an emergent plane of the deflector 20 and a base surface (incident surface) of the second optical expander 60 are joined together, thereby forming a single optical component 170. The optical component 170 has four optical surfaces: one conical surface 171 having a plated reflecting film, one totally reflecting inner conical surface 172, whereby symmetrical axis of the optical surfaces 171 and 172 are mutually perpendicular; one small surface 173 at a vertex of the conical surface 171, and having same perpendicular symmetrical axis as that of the conical surface 171, and one totally reflecting surface 174 symmetrically configured at an angle of 45° to the optical surfaces 171 and 173; together with an optical cylindrical surface 175 having same symmetrically axis as that of the totally reflecting inner conical surface 172.

Figure 8A:
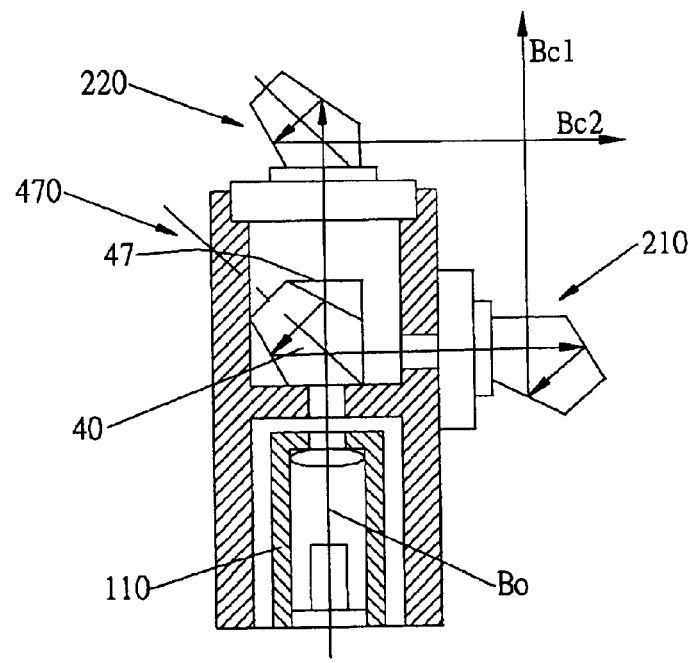
FIG. 8a represents a module of the second embodiment utilizing the rotating pentagonal prism.

In a second embodiment of the present invention, a beam splitting optical deflector is placed in the optical path before the first optical expander. See FIG. 8a, which depicts utilizing two devices as two rotating optical expanders 210 and 220. The light beam Bo emitted from the laser module 110 is first irradiated towards an optical deflector 470 having beam splitting functionality (depicted in FIGS. 8a and 8b as the pentagonal prism 40 configured with an optical wedge 47). A refracted light beam from the optical deflector 470 irradiates towards the first rotating expander 210, whereby the refracted light expands and scans to form the perpendicular optical plane Bc1. A light beam passing through the optical deflector 470 irradiates towards the second rotating expander 220, wherefrom the light beam expands and scans to form the horizontal optical plane Bc2.

Figure 8B:
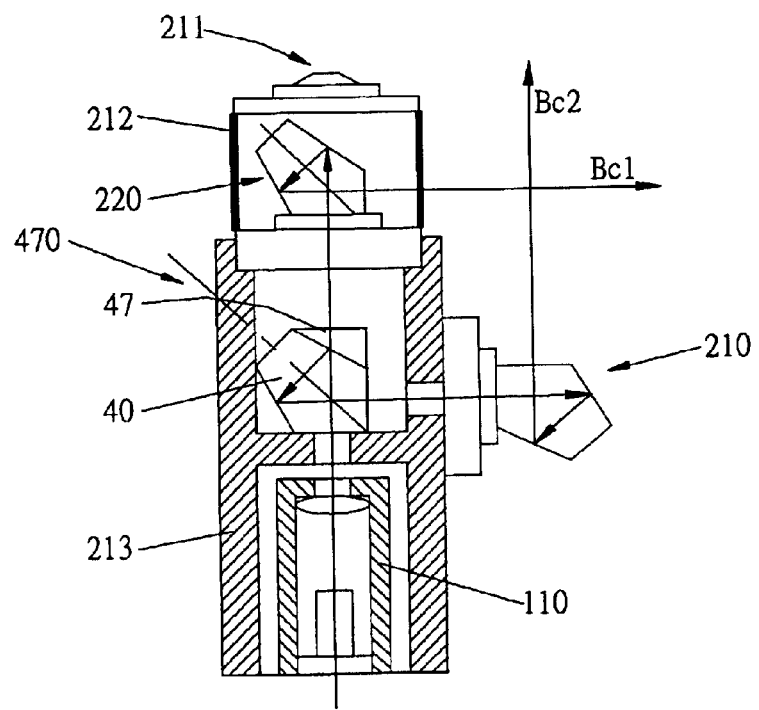
FIG. 8b represents a module of the second embodiment utilizing the rotating pentagonal prism to simultaneously produce a horizontal optical plane and a perpendicular optical plane.

FIG. 8b depicts an assembled modular device of a horizontal instrument. A bubble 211 for indicating a horizontal position is configured on a cylindrical transparent window 212, and the cylindrical transparent window 212 is firmly joined together with a housing 213 thereof. During instrument adjustment, the first optical plane Bc1 is first adjusted to a horizontal position, thereupon the second optical plane Bc2 automatically aligns into a perpendicular position.

Figure 8C:
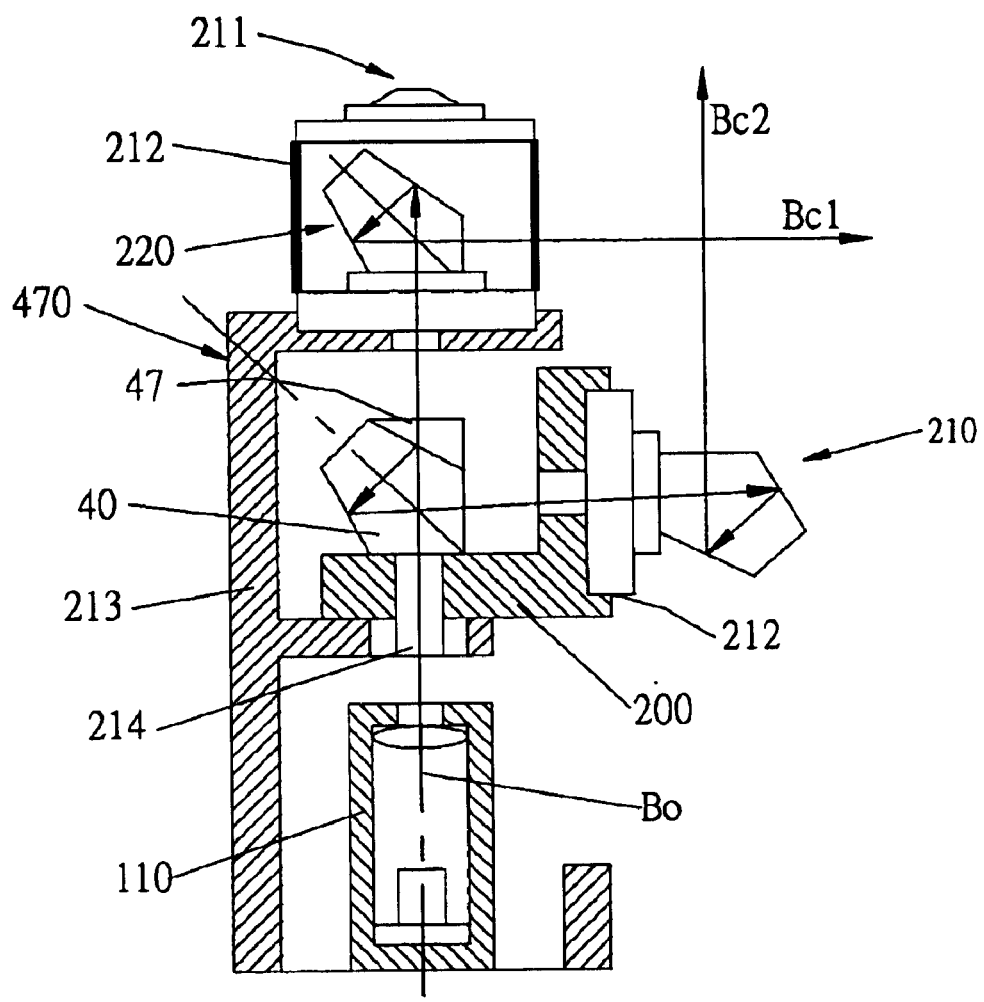
FIG. 8c represents a module of the second embodiment utilizing the rotating pentagonal prism to simultaneous produce the horizontal optical plane and the rotating perpendicular optical plane.

The second rotating expander 210 together with the optical deflector configured with the optical wedge 47 and the prism 40 are securely fixed to the housing 213. Referring to FIG. 8c, through a deflecting mechanism 200 and an axis bearing 214 that allows free movement of the second rotating expander 210, thereby allowing the expander 210 to horizontally scan, whereby the second optical plane Bc2 projected therefrom can appear at any angular position perpendicularly to the first horizontal optical plane Bc1 (excepting limitations imposed by the housing structure).

Figure 8D:
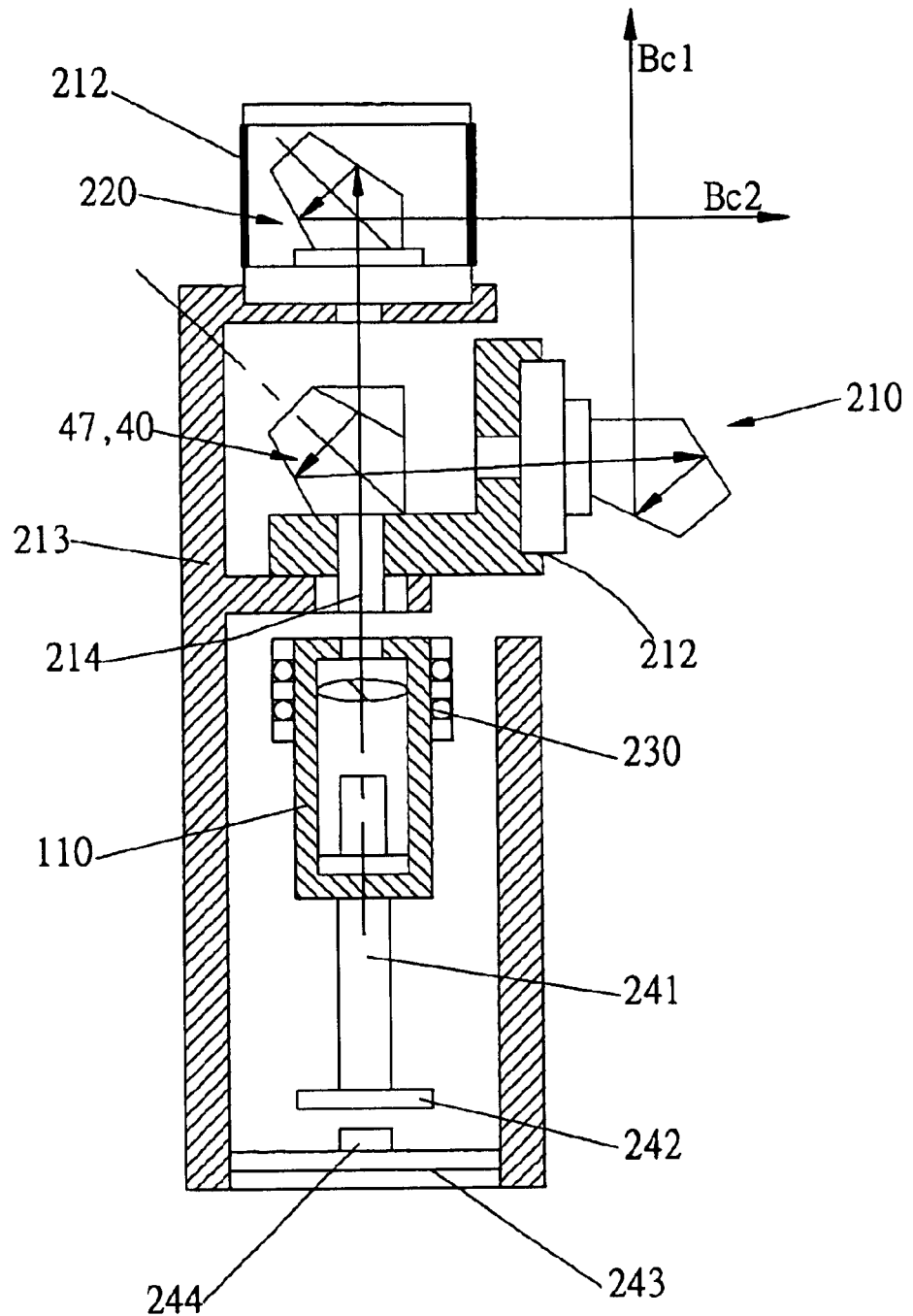
FIG. 8d represents a module of the second embodiment utilizing the rotating pentagonal prism to automatically and simultaneously produce a horizontal optical plane and a rotating perpendicular optical plane.

Referring to FIG. 8d, which shows a self-leveling instrument perpendicularly suspended under gravity from an axial rotating platform 230. The laser module 110 connects to a plumb through a cantilever 242. Upon the plumb 242 taking up an equilibrium position, the fine light beam Bo irradiates from the laser module 110 collinear with a line of gravitation. When the plumb 242 deviates from an equilibrium position, gravitational pull will restore the plumb to the equilibrium position until the light beam Bo is collinear again with the line of gravitation.

A static steel plate may be configured directly below the plumb 242, upon which is affixed at least one permanent magnetic body 244. Upon the plumb 242 oscillating, magnetic lines of force of the magnetic body 244 are segmented resulting in a magnetic pull that quickly returns the plumb 242 to the equilibrium position.

Figure 9:
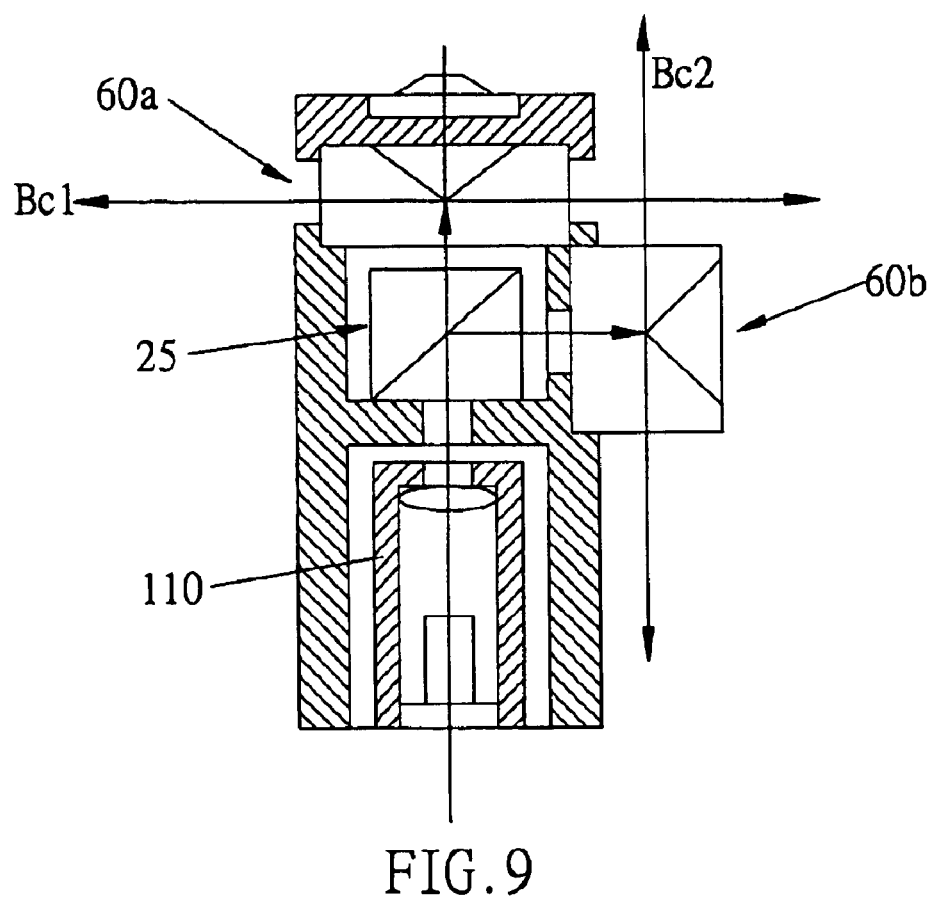
FIG. 9 represents the second embodiment utilizing the conical totally reflecting mirror (holophote).

FIG. 9 shows another structural device of the second embodiment of the present invention, wherein the structural device utilizes two conical optical expanders 60a and 60b with their respective symmetrical axis being mutually perpendicular. A light beam irradiates from the laser module 110 and reflects from the second optical deflector 25, therefrom the reflected light beam irradiates towards the second optical expander 60b, from which the light beam is reflected and forms the second optical plane Bc2. The light beam passing through the second optical deflector 25 irradiates towards the first optical expander 60a, from which the light beam is reflected and forms the first optical plane Bc1. A bubble depicted in FIG. 9 can be utilized to orientate the first optical plane as a horizontal plane.

All conical expanders utilized in the present invention can be utilized as the first optical expander and the second optical expander, wherein the conical expanders can be fabricated together with aforementioned disclosed optical deflectors to assemble a variety of combinations and diversified designs therefrom. In particular, the second optical expander can be configured to rotate around an axial center of the incident light beam Bo and the first optical deflector, whereby the optical plane produced is perpendicular to the first expanded plane of the first optical expander, enabling the second optical plane to be projected in any arbitrary direction thereof.

In addition, a device of the present invention may be utilized in specific leveling instruments, whereby the device can automatically or manually produce simultaneously one horizontal plane and one perpendicular plane.

A fundamental proposition of the present invention is such to utilize two optical expanders, wherefrom light beams are transmitted through optical deflectors to simultaneously produce two mutually perpendicular optical planes.

Advantages of the present invention:
1. Uncomplicated structure, and requiring little effort to operate.
2. Simplification in producing one optical plane (light beam), and together with another optical plane perpendicular to the first optical plane can be adjusted to perpendicularly irradiate any angular position of surroundings.
3. Utilizes an optical system, which devises an all-new system that enables producing a horizontal light beam, in addition to being able to simultaneously produce a perpendicular light beam.

In conclusion, the present invention assuredly ameliorates shortcomings of prior art designs. Furthermore, the present invention has not yet been made public, and thus complies with stipulated patent law regulations; therefore a patent application is submitted herewith.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A device capable of producing two mutually perpendicular laser beam planes comprising:
   a) at least one laser module emitting an irradiated light beam and having:
      i) a semiconductor laser emitting a diffused light beam; and
      ii) a focusing system focusing the diffused light beam and emitting the irradiated light beam;
   b) at least one optical deflector deflecting and splitting the irradiated light beam into two perpendicular light beams, each of the at least one optical deflector includes a prism and an optical wedge correcting a transmission declination resulting from a refracting surface of the prism; and
   c) two light beam expanders, each of the two light beam expanders has a conical shaped interior and hollow electric motor, each of the two light beam expanders expanding one of the two perpendicular light beams into one of two perpendicular optical planes.

2. The device capable of producing two mutually perpendicular laser beam planes as claimed in claim 1, wherein the at least one optical deflector is a reflecting optical component.

3. The device capable of producing two mutually perpendicular laser beam planes as claimed in claim 1, wherein the at least one optical deflector is configured with a beam splitting film, and utilized as a semi-reflecting, beam splitting optical component.

4. The device capable of producing two mutually perpendicular laser beam planes as in claim 1, wherein the at least one optical deflector is placed after a first expander of the two light beam expanders.

5. The device capable of producing two mutually perpendicular laser beam planes as in 1, wherein the at least one optical deflector is placed before a first expander of the two light beam expanders.

6. The device capable of producing two mutually perpendicular laser beam planes as in 1, wherein one of the two light beam expanders rotates one of the two perpendicular optical planes around and perpendicular to a central axis of the at least one laser module.

7. The device capable of producing two mutually perpendicular laser beam planes as claimed in claim 1, wherein the laser module is firmly affixed to an axial rotatable platform having an axis collinear with gravitational pull and perpendicular to two mutually perpendicular optical planes; upon a plumb being in an equilibrium position, a fine laser beam irradiated from the laser module is collinear with gravitational pull, when the plumb deviates from the equilibrium position, gravitation pulls on the plumb, and returns the plumb to the equilibrium position, whereupon the fine laser beam irradiating from the laser module is again collinear with gravitational pull, thus enabling producing one horizontal plane and one perpendicular plane; upon the plumb oscillating, magnetic lines of force of a permanent magnetic body are segmented resulting in a magnetic pulling force that quickly returns the plumb to the equilibrium position.

8. The device capable of producing two mutually perpendicular laser beam plates as claimed in claim 6, wherein the laser module is firmly affixed to an axial rotatable platform having an axis collinear with gravitational pull and perpendicular to two mutually perpendicular optical planes; upon a plumb being in an equilibrium position, a fine laser beam irradiated from the laser module is collinear with gravitational pull, when the plumb deviates from the equilibrium position, gravitation pulls on the plumb, and returns the plumb to the equilibrium position, whereupon the fine laser beam irradiating from the laser module is again collinear with gravitational pull, thus enabling producing one horizontal plane and one perpendicular plane; upon the plumb oscillating, magnetic lines of force of a permanent magnetic body are segmented resulting in a magnetic pulling force that quickly returns the plumb to the equilibrium position.

9. The device capable of producing two mutually perpendicular laser beam planes as claimed in claim 1, wherein the laser module connects to a copper disk-shaped plumb through a cantilever.

10. The device capable of producing two mutually perpendicular laser beam planes as claimed in claim 6, wherein the laser module connects to a copper disk-shaped plumb through a cantilever.

11. The device capable of producing two mutually perpendicular laser beam planes as claimed in claim 1, wherein a static plate is configured directly below the plumb, upon which is affixed at least one permanent magnetic body, and together with the plumb forms a pulling-motion system.

12. The device capable of producing two mutually perpendicular laser beam planes as claimed in claim 5, wherein a static steel plate is configured directly below the plumb, upon which is affixed at least one permanent magnetic body, and together with the plumb forms a pulling-motion system.

13. The device capable of producing two mutually perpendicular laser beam planes as claimed in claim 1, wherein a bubble leveling instrument may be configured on an external surface of a housing, and utilized to provide a horizontal reference surface.

14. The device capable of producing two mutually perpendicular laser beam planes as claimed in claim 1, wherein a reflecting conical surface of each of the two light beam expanders is totally reflecting.

15. The device capable of producing two mutually perpendicular laser beam planes as claimed in claim 6, wherein a reflecting conical surface of a each of the two light beam expanders is totally reflecting.

16. The device capable of producing two mutually perpendicular laser beam planes as claimed in claim 1, wherein a central position of the conical optical expander provides functionally for the light beam passing through each of the two light beam expanders to form another light beam.

17. The device capable of producing two mutually perpendicular laser beam planes as claimed in claim 6, wherein a central position of the conical optical expander provides functionally for the light beam passing through each of the two light beam expanders to form another light beam.

* * * * *